Inventor
H. KANEKO
By [signature]
Attorney

DECODING DEVICE WITH A NONLINEAR COMPANDING CHARACTERISTIC

Filed Jan. 13, 1964 3 Sheets-Sheet 2

Inventor
H. KANEKO
By [signature]
Attorney

DECODING DEVICE WITH A NONLINEAR COMPANDING CHARACTERISTIC

Filed Jan. 13, 1964 3 Sheets-Sheet 3

Inventor
H. KANEKO
By [signature]
Attorney

United States Patent Office 3,397,396
Patented Aug. 13, 1968

3,397,396

DECODING DEVICE WITH A NONLINEAR COMPANDING CHARACTERISTIC

Hisashi Kaneko, Tokyo, Japan, assignor to Nippon Electric Company, Limited, Tokyo, Japan, a corporation of Japan Filed Jan. 13, 1964, Ser. No. 337,310
Claims priority, application Japan, Jan. 30, 1963, 38/4,213
16 Claims. (Cl. 340—347)

This invention relates to a pulse code modulated (PCM) decoder-encoder and to digital-analogue analogue-digital converters and more particularly to decoding-encoding devices or circuits with a nonlinear companding characteristic for nonlinearly converting digital quantities into analogue quantities and vice versa.

The conversion of information into digital signals by sampling, quantizing, and encoding analogue signals representing analogue quantities such as voice, pictures data etc., provides substantial technical advantages such as decreased susceptibility to noise during transmission and handling of the information. Analogue signals or sampled analogue signals are generally quantized with equal quantization steps. However some analogue signals, such as voice signals in which signals of smaller amplitudes frequently occur, are preferably quantized with minor quantization steps for signals of smaller amplitudes as compared with quantization steps for larger amplitude signals. For such nonlinear quantization, analogue signals have been either compressed or expanded by an instantaneous compandor, in which the inherent nonlinearity of nonlinear circuit elements such as semiconductor devices or vacuum tubes are utilized, and then quantized linearly. With such nonlinear quantization whose characteristic depends on the inherent nonlinearity of nonlinear circuit elements, it has been impossible to obtain uniform nonlinear quantization characteristics because circuit characteristics vary with temperature, age of the components, etc.

In determining which nonlinear companding characteristic to use, it has been found that a logarithmic companding characteristic is preferred because of reasons such as the fact that the signal-to-noise ratio is independent of the input signal levels and that human senses respond in logarithmic relation to the applied stimulus as is known from Weber-Fechner's Law. Additionally a hyperbolic companding characteristic has been found to be particularly suitable to handling of voice signals or the like since, for example, the hyperbolic sine is a single-valued function.

There have been some proposals in the prior art relating to decoding devices which have a logarithmic or other nonlinear characteristic. However, these devices utilize nonlinear circuit elements to obtain nonlinearities. Moreover, none of these proposed decoding devices is sufficiently stable, and they are not easily designed and manufactured with identical lumped-constant passive-network attenuators or with one or more distributed—constant passive-network attenuator lines. None of these prior art decoding devices provides a hyperbolic function companding characteristic, and none is simple in construction and stable in operation.

In my co-pending U.S. application S.N. 314,765, filed on Oct. 8, 1963, entitled, "A Decoding Circuit With Nonlinear Companding Characteristics," and based on Japanese patent application No. 45134 of 1962, there is disclosed an encoding-decoding circuit utilizing a plurality of passive networks to provide a nonlinear companded output signal in accordance with the code of the applied input signal. Each passive network generally included an impedance between a pair of terminals and a switch controlled by the input signals for short-circuiting said impedance. In my aforementioned companding application S.N. 314,765, a plurality of such attenuating portions could be used in cascaded form. A power supply would then be connected to one end of the cascaded attenuating means and the output taken from the other end thereof. The selective operations of the switches would vary the attenuation of the attenuating means thereby to provide a coded output. In other words, each portion of said system has two attenuation states: one when the impedance is in circuit between the power supply and the output; the other when the impedance is shorted out. Additionally since the switching of the impedances varied in accordance with the binary value of the input, different numbers and combinations of switches must be activated for each value of the input. For example, the binary representation of the number 4 is 100. This might require two impedances (the two zeros) to be shorted out; the binary representation of the number 5, 101, on the other hand, would only require one impedance (one zero) to be shorted out.

The present invention provides a simplified, more reliable device than my companding application. The switches in the present invention do not short out the impedances, rather they are utilized to selectively make circuits through given attenuating portions. There is no variation of the attenuation of the attenuating portions, from 0 to a fixed value. In this invention the attenuation remains constant. Additionally only a fixed number of switches are activated by the input. This number does not vary with the value of input whether the input be in digital form or in the form of a signal representative of an analogue quantity.

An object of this invention, therefore, is to provide a decoding device whose nonlinear companding characteristic is not dependent on the nonlinearity of nonlinear circuit elements.

Another object of this invention is to provide a decoding-encoding device that is simple in construction and design and which is stable in operation.

Another object of this invention is to provide a decoding device which has a hyperbolic function companding characteristic.

According to the invention, there is provided a decoding-encoding device which comprises an attenuator line composed either of lumped-constant circuit elements or of a distributed-constant circuit element and which has a logarithmic, hyperbolic-function, or other nonlinear companding characteristic.

According to the invention, there is also provided a decoding-encoding device which is a combination of a plurality of decoding units with logarithmic or other nonlinear companding characteristics and which has a hyperbolic-function or other nonlinear companding characteristic.

More particularly, in one embodiment, this invention provides a decoding device which converts an input digital quantity to be decoded into an output analogue quantity by companding the digital input according to a given law. The device includes an attenuator assembly or an attenuator line consisting of a plurality of cascaded attenuator portions, such as attenuator each composed of lumped-constant circuit elements or attenuator portions composed of distributed-parameter circuit elements. The attenuator line or assembly has a plurality of spaced taps which have the same characteristic impedance Z and have an attenuation constant or constants determined in relation to the given law; the device also includes means for deriving the output analogue quantity from one or more of the selected taps and means for supplying an input electric quantity to one or more of the taps in accordance with the input digital quantity. The selected taps, may be one or both of the end taps at the terminals or ends of the attenuator assembly.

This invention furthermore provides a decoding device which converts an input digital quantity to be decoded, into an output analogue quantity by companding the input signal according to a given hyperbolic-function or other nonlinear law, said device comprising a plurality of decoding units each having a logarithmic or other nonlinear companding characteristics, and each producing a plurality of output analogue quantities, respectively corresponding in the input digital quantity; and an arithmetic circuit for performing a predetermined operation among the output analogue quantities produced from the decoding units, the logarithmic or other nonlinear characteristics and the predetermined operation being selected according to the given nonlinear law.

According to an aspect of the invention, there is provided a decoding device with a nonlinear companding characteristic wherein the attenuator assembly is made to have two ends with taps thereat. The output analogue quantity or quantities are taken out at one or both of the end taps. The taps may be numbered consecutively along the attenuator, such that each tap corresponds to a different input digital quantity. The input signal is then applied to the tap whose value corresponds to said input. By supplying those output analogue quantities which are obtained at the end tap to an arithmetic circuit which performs a selected operation on the analogue quantities, it is possible to provide a decoding device with the desired hyperbolic function or other companding characteristic.

According to a second aspect of the invention, there is provided an encoding device with a nonlinear companding characteristic wherein the attenuator assembly has an annular shape and a plurality of taps. One of these taps is selected arbitrarily as an "end" tap, and the other taps are numbered consecutively therefrom, such that each represents a different input quantity. The output analogue quantity is taken out at the optionally selected "end" tap. The input electric quantity is supplied to one of the other taps in accordance with the input digital quantity. If each half of the assembly is provided with taps corresponding to the input values of the input and the output is taken from one selected tap, then the electric quantity and a complementary electric quantity may be supplied to a pair of taps which are correspondent (on each half of the assembly) with the input digital quantity. The taps in both cases are arranged to have specific relations to the selected input taps or taps such that the companding characteristic is determined relative to the aforementioned law and the shape and dimensions of the annulus.

According to a third aspect of the invention, there is provided a decoding device with a nonlinear companding characteristic wherein the attenuator assembly is made to have two ends, the end taps are respectively supplied with electric quantities whose magnitudes have a predetermined interrelationship, and the output analogue quantity is taken out at a tap which is numbered to correspond with the given digital quantity when counted in a given sense from the center tap, the companding characteristic being determined according to the given law and the predetermined interrelationship.

According to a fourth aspect of the invention, there is provided a decoding device with a nonlinear companding characteristic wherein the attenuator assembly is provided with two ends, the output analogue quantity is arranged to be taken out at the center tap, and the electric quantities whose magnitudes have a predetermined relationship are applied to the respective ones of a pair of taps which are both numbered in correspondence to the given input digital quantity when counted in a given sense respectively from both the first quarter and the third quarter taps which are disposed at the midpoints between the center tap and the end taps, the companding characteristic being determined by the given law and the predetermined relationship.

According to a fifth aspect of the invention, there is provided a decoding device with a nonlinear companding characteristic wherein the decoding units are on the one hand, a decoder with a nonlinear companding characteristic described in an article by J. C. H. Davis entitled "A P.C.M. Logarithmic Encoder for a Multichannel TDM System" and published in the Proceedings of the IEE, vol. 109, pp. 481–483 (November 1962), and on the other hand, at least one similar decoder with a nonlinear companding characteristic operated by the same power source or by a separate power source which generates an electric quantity whose magnitude is in a predetermined relationship to that of the power source of the first-named decoder.

In the first aspect of the invention, it is necessary to make the impedance of the means for deriving the output analogue quantity equal to the characteristic impedance Z and to terminate, if the output analogue quantity is to be taken out at only one of the end taps, the other end tap with a terminal impedance whose impedance is equal to the characteristic impedance Z. In the second to the fourth aspects of the invention, the load impedance of the means for deriving the output analogue quantity must be sufficiently larger than the characteristic impedance Z. In the fifth aspect of the invention, it is required to make the input impedance of the arithmetic circuit which is a sort of the output analogue quantity deriving means, equal to the characteristic impedance Z.

In the first, the fourth, and the fifth aspects of the invention, the output impedance of the electric quantity supplying means is not critical. However, the source impedance of the electric quantity supplying means, must, in the second aspect of the invention, be sufficiently larger than the characteristic impedance Z, and in the third aspect, be equal to the characteristic impedance Z. Incidentally, in the first through the fourth aspects of the invention it is possible to determine whether the input digital quantity corresponds to the relative relation between the tap from which the output analogue quantity is taken out and the tap to which the electric quantity is supplied. This is accomplished by means of contacts connected to the respective taps, a common contact which may be paired with the contacts to be tested, and a switch or contact controller which selectively closes at least one among such contact pairs and opens the remaining pairs. Such contact pairs and the associated switch controller may in principle be a rotary switch. It is also to be noted here that although the attenuator portions must have a given characteristic impedance Z, their attenuation ratios or attenuation factors need not be constant but may be selected to provide the desired overall attenuation characteristic. When it is desired to make the attenuation ratio of the attenuator portions different from each other, it is possible in a distributed-parameter circuit, to dispose the taps along a longitudinally homogeneous resistor at unequal spacings.

Generally, a decoding device for decoding an input digital quantity given by an $n$-bit $m'$ary code according to the invention requires contact pairs or switches, $m^n=N$ in number, and $N-1$ attenuators or attenuator portions. Even in such a case it is possible to selectively close a particular one of the N switches in compliance with the given $n$-bit $m'$ary code and to open the remaining ones or namely to transform the $m'$ary code into the N switch positions by way of using a diode matrix as the switch controller. The specific construction of such a one-out-of-N switch, may be found for example in: "Pulse and Digital Circuit," written by Millman and Taub, pp. 422–424, published by McGraw-Hill.

That the use of a decoding device of this invention may be used as a local decoder which can be used as a feedback encoder having a nonlinear companding characteristic determined by the decoding characteristic of the decoding device, will be apparent, for example, from "Coding by Feedback Method," contributed by B. D. Smith to Proceedings of the I.R.E., 1953, pp. 1053–1058 (August). Likewise, it is possible to provide a parallel feed forward encoder by means of a plurality of these decoding devices.

A decoding device of this invention provides a decoding network which has only passive networks except for the power source, switches, and switch controller, and has a decoding characteristic which is stable notwithstanding changes in the ambient temperature. This device is also suitable, to high speed operation if the characteristic impedance Z of the attenuator portions is reduced to the order of 75 ohms. Also, the decoding device of the invention wherein all the attenuator portions have a given characteristic impedance Z, always has a constant output impedance regardless of the switch closed. This is convenient in many respects for an output circuit such as a terminal impedance. Furthermore, in the decoding device of the invention wherein the switches are disposed at equivalent positions with respect to the power source, use of a semiconductor device such as transistors or diodes will not have any influence on the nonlinear characteristic of the decoding device caused by the residual voltages, if any, of the switching semiconductor device if the residual voltages are uniform. It is to be noted here that in a transistor switch, for example, the residual voltage is the saturation voltage between the collector and the emitter. Furthermore, the input impedance as viewed from any of the switches to the attenuator assembly is $Z/2$ irrespective of the switch through which the electric quantity is fed. Therefore, the saturation resistance of a switch composed of a semiconductor device does not cause any effect on the nonlinearity of the decoding device so long as the deviations of the saturation resistances are within a range corresponding to the allowance of the decoding characteristic. Additionally, the regulation or the dynamic characteristics of the power source is not critical in the aspects of the invention except the fourth and the fifth ones, because the input impedance of the decoding network when viewed from the power source terminal is $Z/2$ if the saturation resistance (which is generally very small as compared with the input impedance) is neglected, and is constant regardles if switch is closed. It should also be noted that for switches which, in general, should be in conventional decoders, the so-called transmission gates for transmitting the analogue electric quantity from the power source to the attenuator assembly may equivalently be the so-called logical gates and may therefore be easily designed and be adapted to stabilize the decoding characteristic, because the switches are connected to a definite power source and because the current flowing through any of the switches is independent of the switch being closed and consequently of the magnitude of the decoded output.

The above mentioned and other features and objects of this invention and the manner of obtaining them will become more apparent and the invention itself will be best understood by reference to the following description of the embodiments of the invention taken in conjunction with the accompanying drawings in which.

Figures 1, 2, 3, 4, 5, 6:
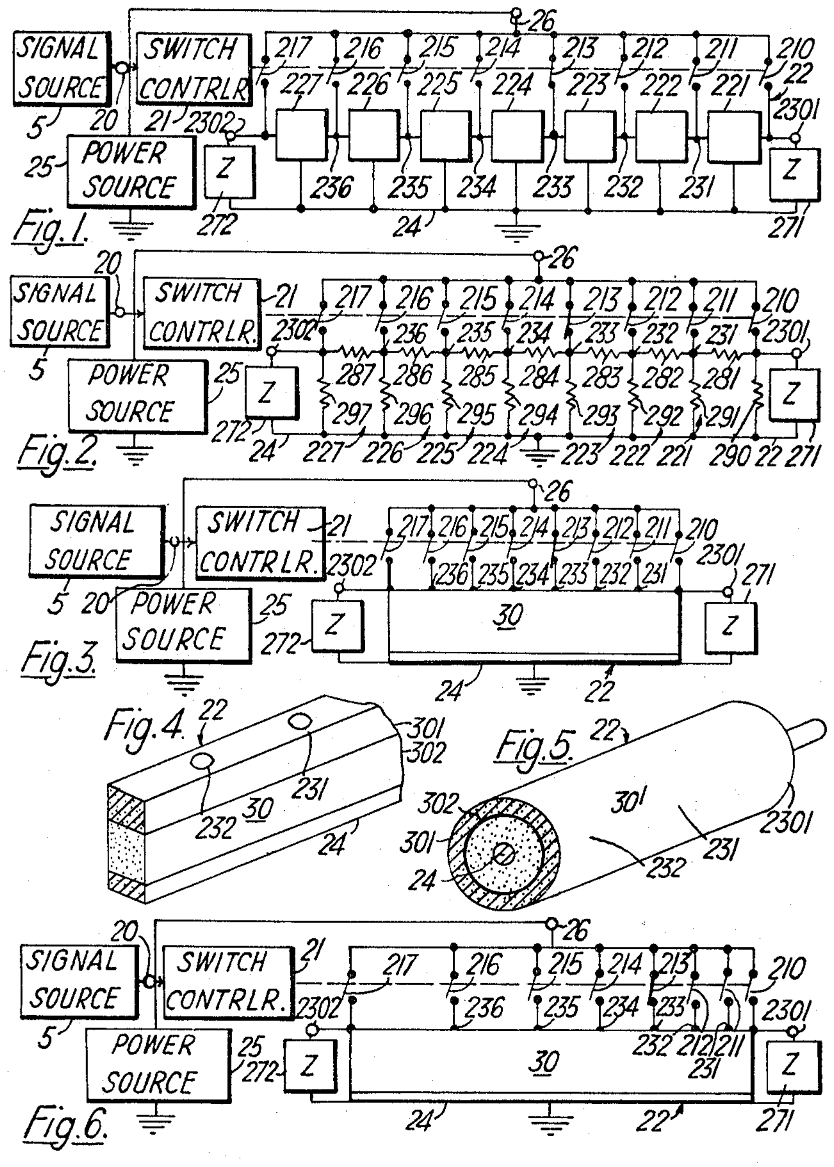
FIG. 1 is a block diagram of an embodiment of the invention.
FIG. 2 is a circuit diagram, partly in block form of a more specific example of the embodiment shown in FIG. 1.
FIG. 3 is a block diagram of another embodiment of the invention.
FIGS. 4 and 5 are respectively diagrammatical perspective views, partly cut away to show the cross section, of modifications of the attenuator assembly in the embodiment shown in FIG. 3.
FIGS. 6 through 12 are circuit diagrams, shown partly in blocks, of additional embodiments of the invention.

FIG. 1, illustrates in block form a decoding circuit which operates in accordance with the teachings of this invention and which is adapted to decode a three-digit binary codeword. The decoding circuit utilizing a lumped constant circuit and includes an input terminal 20 for receiving the binary codeword; from signal source 5, eight electronic or mechanical contact pairs or switches 210–217 ($2^3=8$) corresponding to the eight digital quantities 0–7 or the eight quantization levels represented by the three-digit binary codewords, respectively; a switch controller 21 for closing the particular switch that corresponds to the digital quantity represented by the received binary codeword; an attenuator assembly or attenuation line 22 composed of seven cascaded attenuator portions or attenuators 221–227 ($2^3-1=7$) having the same attenuation ratio G and the same characteristics impedance Z, end taps 2301 and 2302 at the terminals or ends of the cascaded attenuators 221–227; intermediate taps 231–236 provided at the respective points of interconnection between the attenuators 221–227; a ground conductor 24 for connecting the attenuators 221–227 to the earth or some other point of a reference voltage; a power supply terminal 26 for connecting thereto a power source 25 which will supply an electric power of voltage $b$ through the closed one of the switches 210–217 across the ground conductor 24 and the corresponding one of the end and the intermediate taps 2301, 231–236, and 2302; a first utility device or terminal impedance 271 of impedance Z which is connected to the ground conductor 24 and to a first end tap 2301 connected to the zero'th switch 210 corresponding to a digital quantity 0 (zero) and which is adapted to receive thereacross a quantized analogue signal $y$ derived as the output voltage by decoding the given binary codeword; and a second utilization device or terminal impedance 272 of impedance Z which is interposed between the ground conductor 24 and the second end tap 2302.

Now the operation of the decoding device of the invention will be explained in conjunction with the decoding an $n$-digit $m$'ary codeword. If the $(i+1)$-th switch 21$i$ as counted from the first switch 210 (which corresponds to the zero digital quantity) is closed, then the decoded output voltage $y_i$ obtained at the first end tap 2301 will be given by $$y_i=b.G^i$$

because there are $i$ attenuators 221–22$i$ between the first end tap 2301 and that tap 23$i$ which will then connect through the closed switch 21$i$ to the power supply terminal 26. Inasmuch as the attenuation ratio G is less than unity, the magnitude of the decoded output voltage $y_i$ decreases exponentially with the increase of the number $i$ of the switch or of the quantization level.

By putting $$G=(1+u)^{-1/N}$$
$$b=E.(1+u)/u$$

and $$d=E/u$$

and furthermore $$x_i=y_i-d, \qquad (3)$$

it follows that this $x_i$ is related to the number $i$ of the quantization level by the formula:

$$i/N=\log\ (1+ux_i/E)/\log\ (1+u) \qquad (4)$$

Equation 4 represents a logarithmic compression characteristic of the degree $u$ whose compression generally is known as the m$\mu$-characteristic. The degree $u$ of compression which is usually represented by a Greek letter m$\mu$ may be selected at a number between about 100 and 200 in compliance with the desired degree of compression and the voltage E may be set at a voltage which is not smaller than the maximum voltage desired to be obtained as the result of decoding. Then, the Equations 2 give the attentuation ratio G and the voltage $b$ of the power source 25. It is thus possible by subtracting the minute correction voltage $d$ given by the third equality of the Equations 2 from the decoded output voltage $y_i$ appearing at the first end tap 2301, to provide as the result of decoding of the given $n$-digit $m'$ary codeword of the logarithmically companded decoded output $x_i$ corresponding to the number $i$ of the quantization level represented by the given code word. Incidentally, another decoded output voltage $y_i'$ obtained at the second end tap 2302 will become, when the N switches such as the illustrated switches 210–217 are operated by the $n$-digit $m'$ary code word, an analogue signal corresponding to the radix-minus-one's complement of the code and will be equal to $$y_i'=b.G^{N}-i^{-1} \quad (5)$$

Referring to FIG. 2, a more specific embodiment of the decoding device of FIG. 1 is illustrated. This embodiment comprises as the first attenuator 221 shown in FIG. 1 a pi-type attenuator which in turn includes a first resistor 281 interposed between the end tap 2301 and the intermediate tap 231, a second or zeroth resistor 290 interposed between the end tap 2301 and the ground conductor 24, and a resistor 291 connected between the intermediate tap 231 and the ground conductor 24; the second attenuator 222 is another pi-type attenuator which in turn includes a resistor 282 interposed between the first and the second intermediate taps 231 and 232, and a resistor 292 interconnecting the intermediate tap 232 and the ground conductor 24; and so on. If the resistance $R_0$ represents the resistance of any one of the resistors 281–287, and if the resistance $R_1$ represents the resistance of the first and the last resistors 290 and 297, and if the resistance $R_2$ represents the resistance of resistors 291–296 and if these resistances are selected for a given common attenuation ratio G and the characteristic impedance Z of the attenuators 221–227 so that $$\left.\begin{aligned} R_1&=R_2\\ R_0&=(1-G^2)Z/(2G)\\ \text{and}\quad R_1&=(1+G)Z/(1-G)\end{aligned}\right\} \quad (6)$$

then the decoding device of FIG. 2 will operate in the equivalent manner as the decoding device explained with reference to FIG. 1.

The attenuator assembly such as shown in FIG. 1 can be realized not only by a pi-type attenuator as has been described in FIG. 2, but also by a T-type or other known attenuator circuit.

FIG. 3 illustrates, another embodiment of the decoding device of this invention that has a distributed-constant circuit to decode a three-bit binary code, and which comprises as the attenuator assembly 22 a carbon or other solid resistor 30 having a shape of substantial rectangular parallelepiped and the desired characteristic impedance Z and a uniform resistivity. Evaporated along the longer side of resistor 30 is a metal film 24 or the like which acts as the ground conductor. Attached along the side of resistor 30 parallel to the side on which film 24 is evaporated are a plurality of metal bosses such as the taps 2301, 231–236, and 2302.

FIG. 4 illustrates a portion of a distributed-parameter attenuator assembly generally indicated as 22 in FIG. 1 and which may be used in a decoding device of the invention. This assembly comprises in place of the resistor 30 shown in FIG. 2 a plurality of homogeneous resistor portions 301 and 302 having different resistivities, respectively.

In forming an attenuator assembly 22 from a distributed-parameter circuit, the resistor 30 may be made of an entirely homogeneous resistor or of some homogeneous portions depending on which is easier to manufacture and on the attenuation ratios of the attenuator portions 221, 222, and so on. When the resistor 30 is formed, as shown in FIG. 4, of two resistor portions 301 and 302 whose widths are constant throughout the length, it is preferable that the attenuation ratio G (if G is large) be approximately equal to unity; that the attenuator portion 301 (which is on the side of the metal contacts 231–236) be made of material of low resistivity, and that the resistor portion 302 on the side of the ground conductor 24 be made of a material having high resistivity, if on the other hand, the attenuation ratio G is very small, the resistivity of portions 301 and 302 should be reversed. The resistor 30 may be formed of a resistive film coated or evaporated on a body of insulator. In some cases, the resistor 30 may preferably be formed into an annular, a wedge, or other desired shape. Also, the resistor 30 may be extended outwardly beyond the end taps 2301 and 2302.

As shown in FIG. 5, the attenuator assembly 22 may be composed of a hollow cylindrical or other rod-like resistor 30'. The metal contacts 2301, 231, 232, etc. are formed around the resistor 30', so as to define the resistor portions 221, 222, etc. indicated in FIG. 1 and to serve as the end and the intermediate taps. Although the resistor 30' shown in FIG. 5 is composed of two resistor portions 301 and 302, it may be a single resistor or some of the resistor portions may have thickness which vary longitundinally either uniformly or according to a given function.

FIG. 6 illustrates still another embodiment of a decoding device of the invention. In this embodiment the distributed-constant circuit used to decode a three-bit binary code from signal source 5, comprises a resistor 30 having intermediate taps 231–236 disposed lengthwise thereon at unequal intervals. The intermediate taps 231–236 are spaced unequally so that the attenuation factor $a$ of an attenuator portion 23$i$ between the tap 23$i$ (which corresponds to a digital quantity $i$) and the tap 23$(i+1)$ (which corresponds to another digital quantity $i+1$) may be defined by the equation $$a=f(\mathrm{i}) \quad ((6a)$$

and the attenuation ratio G may be defined by the equation $$G=\exp(-a) \quad (6b)$$

If the spacing of taps is in accordance with Equations $6a$ and $6b$, then the decoding devices companding characteristics will provide a decoded output voltage $y_i$ as follows:

$$y=\mathrm{b.exp.}\ (-f(0)+f(1)+\ .\ .\ .\ +f(\mathrm{i}-1)) \quad (6c)$$

This voltage may be obtained at the first end tap 2301. It will be apparent that a decoding device with such a companding characteristic may be obtained also by means of lumped-constant attenuators or of a rod-shaped attenuator assembly such as shown in FIG. 5.

Figure 7:
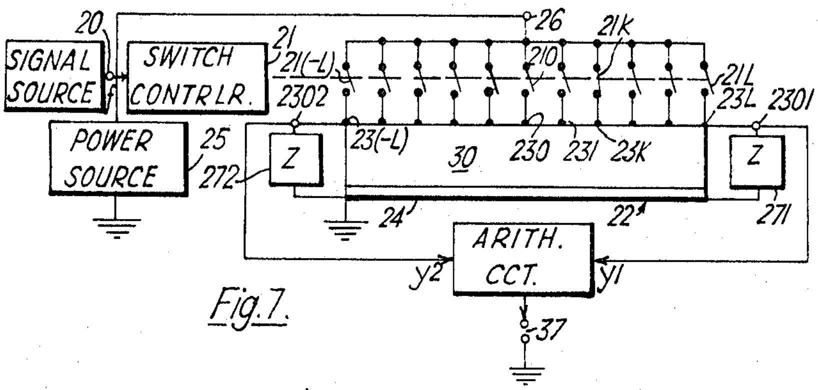

Referring to FIG. 7, a further embodiment of the decoding device of the invention is illustrated which performs decoding in accordance with a hyperbolic function companding characteristic. The device in FIG. 7 comprises a decoding device similar to that illustrated in FIG. 4. An arithmetic circuit 36 is provided which is supplied from the first and the second end taps 2301 and 2302 with decoded output voltages $y_1$ and $y_2$ for performing an adding or a subtracting operation between such voltages $y_1$ and $y_2$. The input impedance of circuit 36 is sufficiently larger than the characteristic impedance Z of the attenuator assembly 22. An output terminal 37 is also provided for taking out from the arithmetic circuit 36 the result of the operation as the final output voltage. Although the input impedance of the arithmetic circuit 36 is assumed in the foregoing to be sufficiently large, the terminal impedances 271 and 272 may alternatively be dispensed with an instead an arithmetic circuit may be substituted therefore whose input impedance for either of the decoded output voltages $y_1$ and $y_2$ supplied thereto may be equal to the characteristic impedance Z. If the taps are equally spaced and the length between adjacent taps are taken as the unit length, then the whole length of the resistor 30 is 2L. If the attenuation factor per unit length of the resistor 30 is $a$, and if a switch 21$k$ connected to an intermediate tap 23k of the resistor 30 (which is at a distance $k$ as measured from the center tap 230 towards the first end tap 2301) is closed, then the decoded output voltages $y_1$ and $y_2$ will be given by $$\left.\begin{aligned} y_1 &= b.\exp(-a[L-k]) \\ \text{and} \quad y_2 &= b.\exp(-a[L+k]) \end{aligned}\right\} \quad (7)$$

respectively. It follows therefore that if the arithmetic circuit 36 is an adder circuit, a final output voltage $y_C$ derived from the adder circuit is $$\begin{aligned} y_C &= y_1+y_2 \\ &= b.\exp(-aL)[\exp(ak)+\exp(-ak)] \end{aligned}$$

or $$y_C = 2b.\exp(-aL).\cosh(ak) \quad (8)$$

from which latter Equation 8 a hyperbolic cosine characteristic follows. A difference voltage $y_C'$ obtained by subtracting a voltage $2b.\exp(-aL)$ from the output voltage $y_C$ of the adder circuit will become zero when the digital quantity $k$ is zero. Incidentally, the hyperbolic cosine which is an even function, has the same value for arguments of equal absolute value and opposite signs. It is not necessary, therefore, to provide those intermediate taps of the resistor 30 which are disposed between the center tap 230 and the second end tap 2302. If such a decording device comprises a decoding network such as shown in FIG. 1 or 2, the attenuators arranged between the center tap and the second end tap may be replaced with a single attenuator. If the arithmetic circuit 36 shown in FIG. 7 is a subtracting circuit, the output voltage $y_S$ derived from such a circuit is given by $$\begin{aligned} y_S &= y_1-y_2 \\ &= b.\exp(-aL).[\exp(ak)-\exp(-ak)] \end{aligned}$$

or $$y_S = 2b.\exp(-aL).\sinh(ak) \quad (10)$$

which shows a hyperbolic sine decoding characteristic is an excellent companding characteristic for voice signals and the like, because the output voltage $y_S$ is a single-valued function of the digital quantity $L-k$ or $k$ and because the companding characteristic for the positive region and the negative region is symmetric with respect to the origin $k=0$ and $y_S=0$. Incidentally, the subtracting circuit may be a known differential amplifier.

If, however, the arithmetic circuit 36 derives the quotient $y_T$ of the difference between the output voltages, then $$y_T = (y_1-y_2)/(y_1+y_2) = \tanh(ak)$$

which manifests a hyperbolic tangent companding characteristic.

Figures 8, 9, 10:
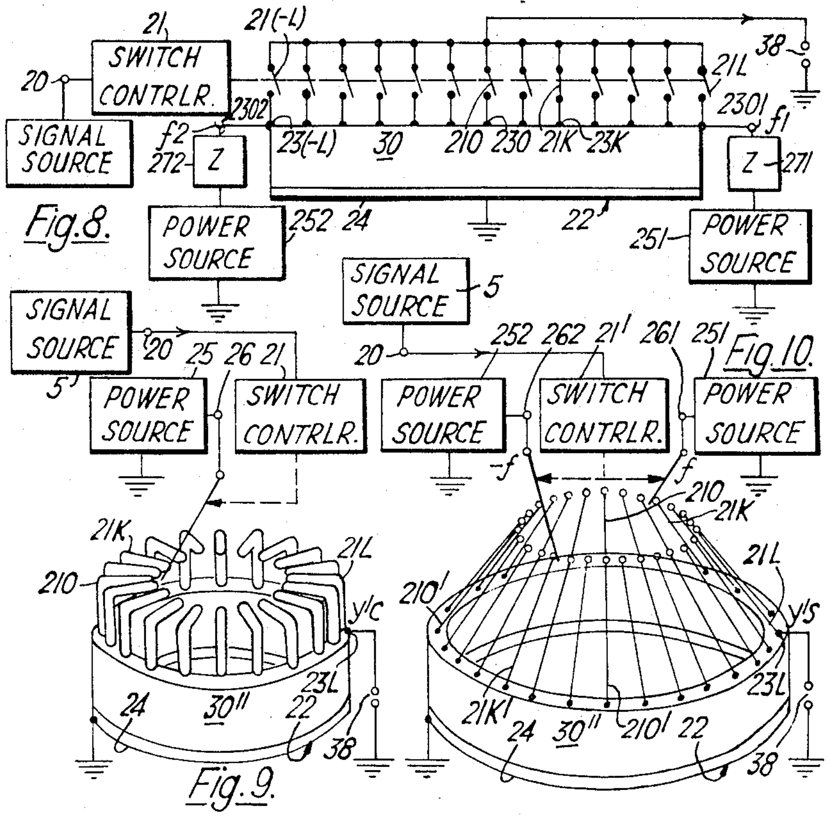

Referring to FIG. 8, another embodiment of the decoding device of the invention is illustrated which differs from the embodiment illustrated in FIG. 7 in that a pair of power sources 251 and 252 are connected between the earth and the first and the second terminal impedances 271 and 272, respectively. The output impedances of these power sources are both sufficiently small as compared with the characteristic impedance Z of the attenuator assembly. The power supply terminal 26 of FIG. 7 is changed to an output terminal 38 whose input impedance is sufficiently larger than the characteristic impedance Z. Alternatively, a power source whose output impedance is equal to the characteristic impedance Z may be used in lieu of both the terminal impedance 271 and the power source 251. When the switch $21k$ (which is connected to such an intermediate tap $23k$ of the resistor 30 as may be disposed at a distance $k$ as measured from the center tap 230 towards the first end tap 2301), is closed, then the decoded voltage obtained at the output terminal 28 will have the hyperbolic cosine characteristic given by Equation 8 if the voltages $b_1$ and $b_2$ supplied from the first and the second power sources 251 and 252 to the first and the second end taps 2301 and 2302, respectively, satisfy the condition $$b_1 = b_2$$

The hyperbolic sine characteristic defined by the Equation 10 will be obtained if $$b_2 = b_1$$

The embodiment shown in FIGS. 7 and 8 can not only comprise a lumped-constant attenuator assembly, but may also comprise a rod-shaped attenuator such as shown in FIG. 5. Furthermore, any of these embodiments may be provided with a different decoding characteristic by providing the attenuator portions with different attenuation ratios in the manner explained with reference to FIG. 6.

FIG. 9 illustrates still another embodiment of the invention which has a hyperbolic cosine decoding characteristic. The device in FIG. 9 differs from the embodiment shown in FIG. 7, in that the attenuator assembly 22 comprises an annular resistor 30″ and consequently does not require the terminal impedances 271 and 272. The arithmetic circuit 36 also is not required. In this embodiment one of the intermediate taps, or the metal bosses, is made to serve as an L-th or (—L)-th tap 23L or 23(—L) which corresponds to both of the end taps 2301 and 2302 and to which connected is an output terminal 38 whose input impedance is sufficiently larger than the characteristic impedance Z of the attenuator assembly 22. If such a switch $21k$ is closed (which switch is connected to a tap $23k$ spaced a distance $k$ in a predetermined sense from a tap 230 which is disposed at a distance L from the L-th tap 23L or which is positioned diametrically opposite to the L-th tap 23L), and if the output impedance of the power source 25 is sufficiently larger than the characteristic impedance Z, then the output voltage $y_C'$ obtained at the output terminal 38 will be given by $$\begin{aligned} y_{C'} &= y_C + y_C.\exp(-2aL) + y_C.\exp(-4aL) + \ldots \\ &= y_C/[1-\exp(-2aL)] \end{aligned} \quad (11)$$

where $Y_C$ is the voltage given by the equation 8, and thus has a hyperbolic cosine characteristic. Alternatively, connection of the power supply 25 to the L-th tap 23L and substitution of the output terminal 38 for the power supply terminal 26 shown in FIG. 9 will make the embodiment of FIG. 9 correspond to the decoding device of FIG. 8 and will provide the hyperbolic cosine characteristic. It is necessary, however, in this alternative form that the source impedance as well as the load impedance be sufficiently larger than the characteristic impedance Z.

Referring to FIG. 10, another embodiment of the decoding device of the invention is shown which has a hyperbolic sine decoding characteristic. In this embodiment, the attenuator assembly 22 is annular in shape and has a length of 4L, or is composed of two serially united attenuator portions of 2L in length. A switch controller 21′ is provided for selectively closing (in compliance with a digital quantity $k$ supplied to the input terminal 20) a pair of switches assigned to the digital quantity $k$ and for opening the remaining switches. The closed switches may for example be switches $21k$ and $21k'$ spaced by the same distance $k$ from two switches 210 and 210′, respectively, and are disposed at the respective midpoints between, on the one hand, an L-th switch 21L connected to the L-th tap 23L (to which is connected an output terminal 38 whose input impedance is sufficiently larger than the characteristic impedance Z of the attenuator line 30″) and, on the other hand, to a (—L)-th switch which is disposed diametrically opposite to the L-th switch 21L (or which is the L-th switch 21L′ in the other attenuator portion of 2L in length and between the switch 21L′) and the first mentioned switch 21L, toward the L-th switch 21L and the other L-th switch 21L′, respectively. A pair of power sources 251 and 252 are connected respectively to terminals 261 and 262. Each source has an output impedances sufficiently larger than the characteristic impedance Z. These sources provide power of voltages $b$ and $-b$ to the attenuator assembly 22 through the switches 21$k$ and 21$k'$ or any other pair of switches closed in the similar manner as the switches 21$k$ and 21$k'$. The decoded output voltages $y_s'$ obtained at the output terminal 38, if expressed by using the voltage $y_S$ given by the Equation 10, is $$y_s'=y_s/[1-\exp(-4aL)] \quad (12)$$

Figure 11:
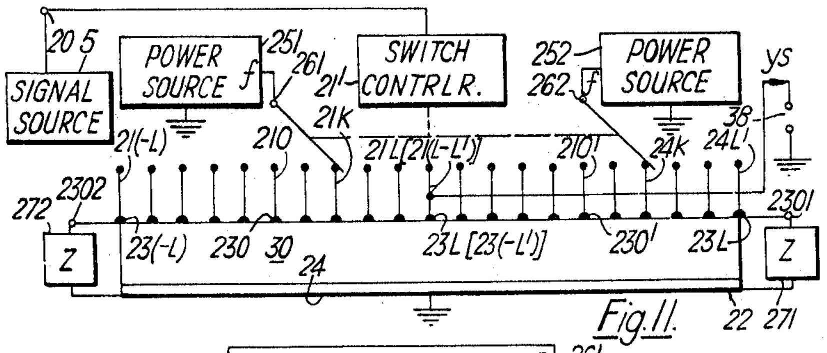
Figure 12:
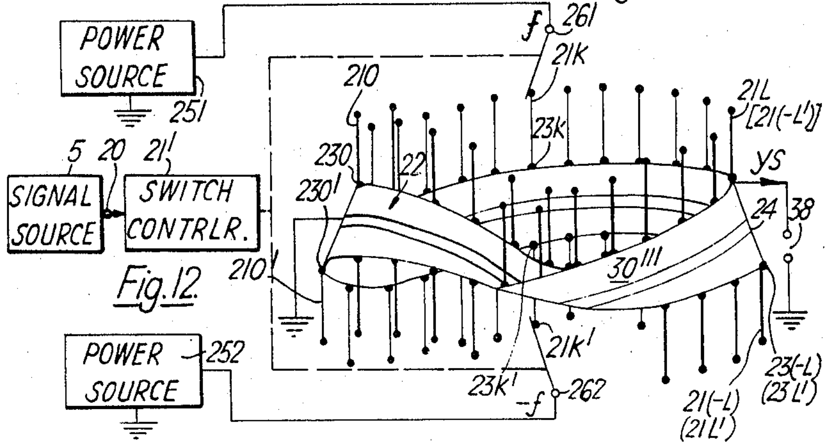

FIG. 11 depicts another embodiment of a further decoding device according to this invention, and which has the decoding characteristic of a hyperbolic sine. This device differs from the decoding device of FIG. 10 in that the attenuator assembly 22 is cut spread at that tap 23L' or 23(−L) to which the (−L)-th switch of one of the attenuator portion or the L-th switch 21L' of the other of the attenuator portion is connected; the tap 23L' or 23(−L) is separated into two end taps 2301 and 2302; terminal impedances 271 and 272 whose common impedance is equal to the characteristic impedance Z of the attenuator assembly 22 are interposed between the ground conductor 24 and the end taps 2301 and 2302, respectively; and an output terminal 38 (whose load impedance is sufficiently large as compared with the characteristic impedance Z) is connected to the center tap or the L-th tap of the one of the attenuator portions or the (−L)-th tap of the other attenuator portion 23L or 23(−L). If a pair of switches 21$k$ and 21$k'$ are closed (which switches are spaced by the same distance $k$ from the zero-th switch 210 and the so-to-say 0'-th switch 210' to be paired with the zero-th switch 210 towards the L-th switch 21L and the L'-th switch 21L') then the decoded output voltage $y_S$ obtained at the output terminal 38 will be given by Equation 10. It should be noted that this embodiment is superior to the embodiment shown in FIG. 7 in that it requires no subtracting circuit, however, it is inferior to the FIG. 7 embodiment because the resistor 30 must be 4L in length and because both the power-source impedance and the load impedances must be large.

Still another embodiment of this invention is illustrated in FIG. 11. This embodiment provides a hyperbolic sine decoding characteristic, and differs from the embodiment of FIG. 10 in that the attenuator assembly 22 comprises a resistor 30''' shaped into the shape of a Mobius' band having a length of 2L along the transversal center line which is provided with a ground conductor 24 along the transversal central portion thereof. The taps 230, . . . , 23$k$, . . . , 23L or 23(−L), . . . , 230', . . . , 23$k'$, . . . , and 23(−L) or 23L' disposed at every unit distance along the endless edge of the Mobius' band. The taps are numbered in this figure from a zero-th tap 230 (which is disposed at a distance L from that tap) to which an output terminal 38 is connected and which present a sufficiently large impedance as compared with the characteristic impedance Z of the attenuator assembly 22. It is to be noted that the tap 23$k$ and that tap 23$k'$ which are spaced from the 23$k$ by a distance 2L are aligned on a straight line which lies in the plane of resistor 30''' and is perpendicular to the center line thereof. When voltages $b$ and $-b'$ are applied to that pair of tap 23$k$ and 23$k'$ (which taps corresponds to the digital quantity $k$ supplied to the input terminal 20), the output voltage $y_S'$ obtained at the output terminal 38 is given by the Equation 12 hereinabove. This output, it should be noted, was also obtained with the embodiment of FIG. 9.

Each of the embodiments shown FIGS. 7 through 11 inclusive may comprise either lumped-constant attenuators or a rod-shaped attenuator assembly such as shown in FIG. 5.

Figure 13:
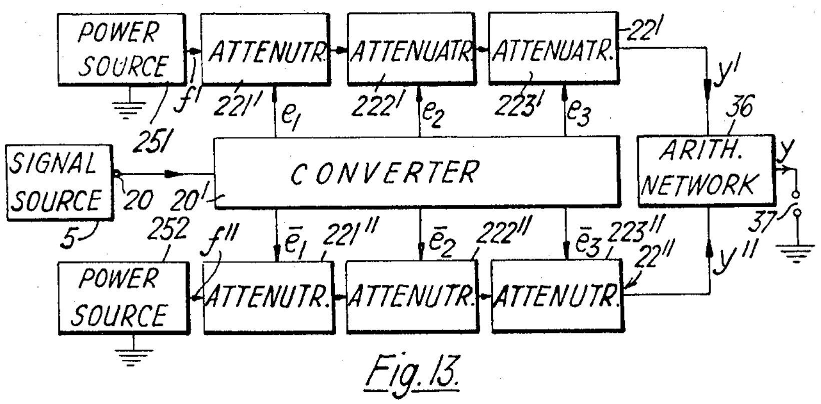
FIG. 13 is a block diagram of still another embodiment of the invention.

Referring finally to FIG. 13, a still further embodiment of decoding device according to this invention is illustrated for providing a hyperbolic function decoding characteristic. This embodiment has input terminal 20 for receiving a digital quantity $i$ to be decoded; converter means 20' for simultaneously producing a set of digit codes such as three-digit binary codes $e_1$, $e_2$, and $e_3$ representing the digital quantity $i$ at the respective digit code output terminals; a first power source 251 for supplying an electric quantity of voltage $b'$; a first attenuator group 22' consisting of cascaded variable attenuators 221', 222', and 223' for attenuating the electric quantity of the voltage $b'$ successively at each of the cascaded stages according as the supplied one of the digit codes represents either 0 or 1, either by unity or by the corresponding one of the attenuator ratios $\exp(-a_1)$, $\exp(-a_2)$, and $\exp(-a_3)$ given by $$\text{and}\quad \left.\begin{aligned}\exp(-a_1)&=(1+u)^{-1/2}\\ \exp(-a_2)&=(1+u)^{-1/4}\\ \exp(-a_3)&=(1+u)^{-1/8}\end{aligned}\right\} \quad (13)$$

respectively, where $u$ is a constant. The embodiment of FIG. 13 also includes a second power source 252 for supplying another electric quantity of a voltage $b''$; a second attenuator group 22'' consisting of cascaded variable attenuators 221'', 222'', and 223'' for attenuating the electric quantity of the voltage $b''$ successively at each of the cascaded stages either by unity or by the corresponding one of the attenuation ratios given by the Equations 13 above according to which digit code ($e_1$, $e_2$, $e_3$) is supplied. These codes represents a 1 or an 0 or may represent the 0 or 1 of the radix-minus-one's complements $\bar{e}_1$, $\bar{e}_2$, and $\bar{e}_3$ of the digit codes. An arithmetic circuit 36 is provided which performs operation between an output $y'$ of the first attenuator group 22' and another output $y''$ of the second attenuator 22'' to derive a resultant decoded output $y$ at an output terminal 37 thereof and whose input impedances are equal to the common characteristic impedance Z of the attenuator groups 22' and 22''. If $$i=(e_1\times 2^2+e_2\times 2+e_3)$$

the output $y'$ of the first attenuator group 22' is $$y'=b'.\exp(-[e_1a_1+e_2a_2+e_3a_3])$$

or $$y'=b'.\exp(-[e_1\times 2^2+e_2\times 2+e_3]a_3)$$

or again $$y'=b'.\exp(-a_3i_1)$$

while the output $y''$ of the second attenuator group 22'' is $$y''=b''.\exp(-[\bar{e}_1\times 2^2+\bar{e}_2\times 2+\bar{e}_3]a_3)$$

or $$y=b''.\exp(-a_3[2^3-1-i])$$

If the arithmetic circuit 36 is an adding circuit, the decoded output voltage $y$ becomes $$\begin{aligned}y&=y'+y''\\ &=b'.\exp(-a_3i_1)+b''.\exp(-a_3[7-i])\\ &=\exp(-7a_3/2).[b'.\exp(a_3[7/2-i])\\ &\qquad+b''.\exp(-a_3[7/2-i])\end{aligned}$$

Now, if $$b'=b''$$

Then the decoded output $y$ will be as follows:

$$y=2b'.\exp(-7a_3/2).\cosh(a_3[7/2-i])$$

which is a hyperbolic cosine companding characteristic. Now, if $$b''=-b'$$

then the decoded output $y$ would be as follows:

$$y=2b'.\exp(-7a_3/2).\sinh(a_3[7/2-i])$$

which is a hyperbolic sine companding characteristic.

In case the arithmetic circuit 36 is a subtracting circuit and if $$b''=b'$$

then a hyperbolic sine companding characteristic will follow. In case the arithmetic circuit 36 is a dividing circuit for deriving a quotient of the difference obtained by subtracting from the output $y'$ of the first attenuator group 22', the output $y''$ of the second attenuator group 22'' and divided by the sum of such outputs $y'$ and $y''$ and in case $$b''=b'$$

then a hyperbolic tangent companding characteristic is obtained. In the decoding device shown in FIG. 13, an attenuator 22*k'* in the first attenuator group 22' and that attenuator 22*k''* among the second attenuator group 22'' which corresponds to the atenuator 22*k'* may be realized by arranging the attenuation ratios of the respective attenuators to be complementarily interswitched to unity and $a_k$ or by arranging the attenuation-ratio interchanging switches so that when the digit code $e_k$ of the corresponding *k*-th digit is 0, for instance, the switch of the former may be in the zero state while that of the latter may be in the one state.

Incidentally, it is possible by arithmetic synthesis of the output analogue quantities of those decoding devices which have been explained with reference to FIGS. 1 through 3 and FIGS. 6 through 13, to derive an output such as may be given by $$y=A_1\sinh(c_1i)+A_2\sinh(c_2i)$$

for different constants $c_1$ and $c_2$.

While there has been described above the principles of this invention in connection with specific apparatus, it is to be clearly understood that this description is made only by way of example and not as a limitation to the scope of the invention, as set forth in the objects thereof and in the accompanying claims.

What is claimed is:

1. A device for converting a coded input signal into a nonlinearly companded output signal comprising:

(a) passive attenuation means having a plurality of defined attenuating portions, (a–1) each defined portion providing a substantially fixed preselected attenuation ratio and having a predetermined substantially constant input impedance thereby to produce a preset nonlinearity;

(b) switch means connected to each defined attenuating portion;

(c) a coded input signal source connected to said switch means;

(d) power supply means and output signal deriving means connected to opposite terminals of said passive attenuation means;

(e) and switch control means under control of said signal source for operating a fixed number, at least one, of said switch means selectively, for each value of the said signals to regulate the energy flow from the power supply means through selected portions of the attenuating means to the output signal deriving means.

2. A device as set in claim 1 wherein the attenuating means comprises a cascaded resistive network.

3. A device as set in claim 1 wherein the attenuating means comprises a plurality of cascaded, lumped-constant attenuating portions.

4. A device as set in claim 1 wherein the attenuating means comprises distributed parameter attenuating segments which are integrally united.

5. A device as set in claim 1 wherein the attenuating means comprises a hollow resistor and a conductor disposed in the hollow of said resistor.

6. A device as set in claim 1 wherein the attenuating means is a sheet shaped resistor.

7. A device as set in claim 1 wherein the attenuating means comprises an annular shaped resistor.

8. A device as set in claim 3 wherein each said defined portion has the same characteristic impedance.

9. A device as set in claim 8 wherein the output signal deriving means comprises a terminal impedance equal in value to said characteristic impedance and connected to one end of the attenuating means and an output circuit connected to the other end of the attenuating means, the input impedance of the output circuit being equal to said characteristic impedance.

10. A device as set in claim 4 in which each attenuating portion has the same characteristic impedance and wherein the output signal deriving means comprises a terminal impedance equal in value to said characteristic impedance and connected to one end of the attenuating means and an output circuit connected to the other end of the attenuating means, the input impedance of the output circuit being equal to said characteristic impedance.

11. A device as set in claim 8 wherein two power sources are provided, each being connected to different ends of the attenuating means and wherein the output signal deriving means comprises an output circuit connected by the switching means to selected attenuating portions, the impedance of said output circuit being greater than said characteristic impedance.

12. A device as set in claim 7 in which each defined portion has the same characteristic impedance and wherein the output signal deriving means comprises an output circuit having an impedance greater than said characteristic impedance and connected to one of said attenuating portions.

13. A device as set in claim 1 wherein the attenuating means provides nonlinear attenuations which vary in accordance with a hyperbolic function.

14. A device for converting input digital signals into a nonlinearly companded analogue output signal comprising: a digital input source; a plurality of decoding devices, each comprising passive attenuation means having a plurality of defined attenuating portions, each defined portion providing a substantially fixed preselected attenuation ratio and having a predetermined substantially constant input impedance thereby to produce a preset nonlinearity; switch means connected to each defined attenuating portion, a coded input signal source connected to said switch means, power supply means and output signal deriving means connected to opposite terminals of said passive attenuation means, and switch control means under control of said signal source for operating a fixed number, at least one, of said switch means selectively, for each value of the said signals to regulate the energy flow from the power supply means through selected portions of the attenuating means to the output signal deriving means, each of said devices being connected to said digital input source, the switch means of each of said devices switching the power supply means associated therewith in accordance with the digital content of the input, each of said devices producing a nonlinearly companded analogue output signal representative of said digital input signal; and an arithmetic circuit connected to receive said analogue output signals for performing a predetermined operation among said outputs.

15. A device for converting an input digital quantity into a nonlinearly companded analogue output quantity comprising:

(a) passive attenuating means having a plurality of defined attenuating portions each defined portion having a fixed predetermined impedance and attenuation ratio to provide a preselected nonlinearity;

(b) switch means connected to each defined attenuating portion;

(c) power supply means and output signal deriving means respectively connected to opposite terminals of the passive attenuation means;

(d) a digital input signal source connected to said switch means;

(e) means for deriving a nonlinearly companded output signal from said attenuating means;

(f) and switch control means under control of said input signals, for operating a fixed number, at least one, of said switch means selectively, for each value of said signals to regulate the energy flow from the power source means through selected portions of the attenuating means to the output signal deriving means.

16. A system for converting an input signal into a nonlinearly companded output signal comprising:

(a) a plurality of devices each as set forth in claim 1, formed into at least two similar groups;

(b) an input signal source;

(c) means for supplying the signals from said input source as the input to the switch means for each device in each group;

(d) and an arithmetic network connected to receive the output signals from each device, for performing a predetermined arithmetic operation among said output signals.

References Cited

UNITED STATES PATENTS 3,180,939 4/1965 Hall ---------------- 340—347

MAYNARD R. WILBUR, *Primary Examiner.*

W. J. KOPACZ, *Assistant Examiner.*